United States Patent [11] 3,607,820

| [72] | Inventors | Hans Wilhelm<br>Ludwigshafen (Rhein);<br>Klaus Gulbins, Limburgerhof, Pfalz;<br>Gerhard Faulhaber, Manheim; Wolfgang<br>Schwindt, Ludwigshafen (Rhein), all of<br>Germany |
|---|---|---|
| [21] | Appl. No. | 684,496 |
| [22] | Filed | Nov. 20, 1967 |
| [45] | Patented | Sept. 21, 1971 |
| [73] | Assignee | Badische Anilin- & Soda-Fabrik<br>Aktiengesellschaft<br>Ludwigshafen am Rhine, Germany |
| [32] | Priority | Nov. 24, 1966 |
| [33] |  | Germany |
| [31] |  | P 16 19 353.6 |

[54] PRINT PASTES AND DYE PASTES
13 Claims, No Drawings

[52] U.S. Cl. ..................................................... 260/33.6, 260/40
[51] Int. Cl. ..................................................... C08f 45/28
[50] Field of Search ............................................ 260/41, 33.6, 875, 885

[56] References Cited
UNITED STATES PATENTS

| 3,264,234 | 8/1966 | Osmond et al. | 260/875 |
| 3,297,623 | 1/1967 | Knapp | 260/885 |
| 3,457,209 | 7/1969 | Mikofalvy | 260/885 |

Primary Examiner—Morris Liebman
Assistant Examiner—L. T. Jacobs
Attorney—Marzall, Johnston, Cook & Root

ABSTRACT: Print pastes and dye pastes for printing and dyeing fibrous materials based on organic dispersion of crosslinkable copolymers as binders for the pigments. The disperse copolymers, which can be used as binders without emulsions, are prepared by polymerization of (a) monomers which bear N-methylol groups or N-alkoxymethyl groups with (b) comonomers which do not contain any of the groups specified under (a), in (c) an organic liquid in which the copolymer is insoluble, and in the presence of a copolymer of comonomers of groups (a) and (b) which is soluble in (c) and acts as a polymeric emulsifier.

PRINT PASTES AND DYE PASTES

The present invention relates to print pastes and dye pastes for printing and dyeing fibrous materials which are based on organic dispersions of certain cross-linkable copolymers as binders for the pigments.

Print pastes and dye pastes for fibrous materials which are based on aqueous dispersions of pigments and cross-linkable copolymers as binders are generally known. Prints and dyeing prepared with these dispersions however are often sensitive to the prolonged action of water because they still contain hydrophilic emulsifiers and protective colloids which originate from the dispersions, and these promote swellability of the coatings which contain pigment, with the result that the pigment particles do not adhere firmly and the coating on the fibers is loosened.

The behavior of dispersions in organic liquids (organic dispersions) is not much different because the emulsifiers required for the purpose, which remain in the coatings, cause the prints and dyeings to be sensitive to organic liquids rather than to water, for example in dry cleaning.

It is the object of this invention to obviate the said disadvantage and to provide print pastes and dye pastes from which prints and dyeings, which are insensitive to the prolonged action of both water and organic liquids, can be prepared.

We have found that the said requirement is fulfilled in an excellent manner by print pastes and dye pastes which contain (in addition to a pigment and an organic liquid) a binder comprising a dispersion of a copolymer obtained by conventional free-radical copolymerization of:

(a) a monomer containing in the molecule at least one N-methylol group or N-alkoxymethyl group with a preponderant amount of (b) a comonomer which does not contain any of the groups specified under (a), in the presence of (c) an organic liquid in which the copolymer formed is insoluble, and also in the presence of (d) a copolymer of comonomers of groups (a) and (b) which is soluble in the organic liquid (c).

Among the comonomers defined under (a), the N-methylolamides and N-alkoxymethylamides of acrylic acid and methacrylic acid are preferred. Corresponding derivatives of crotonic acid, α-chloro-acrylic acid, itaconic acid, maleic acid and N-acryloylurea are also suitable. The alkyl groups in the alkoxymethylamide derivatives preferably contain one to four carbon atoms.

The comonomers (b) may be particularly the compounds most commonly used as building blocks for binders in industry, such as butadiene, styrene, vinyl chloride, vinylidene chloride, acrylonitrile, methacrylonitrile and N-vinylpyrrolidone, and preferably alkyl esters of acrylic acid, methacrylic acid and maleic acid with one to 12 carbon atoms in the alkyl radical and vinyl esters of alkylcarboxylic acids having two to 24 carbon atoms in the alkyl radical. To modify the copolymers chemically (the methods for which are generally known), for example to impart (thereto) an anionic or cationic character, ionic or potentially ionic comonomers (b') may be added in minor amounts, i.e., up to about 50 percent by weight of the amount of (b); examples of these are acrylic acid, methacrylic acid, maleic acid, maleic anhydride, acrylamide, methacrylamide, N-vinylimidazole and N-vinylimidazolium methyl sulfate.

The organic liquid (c) should be such that the copolymer formed is not soluble therein or at least only soluble to such an extent that the liquid phase of the dispersion is not considerably more viscous than the pure liquid, because otherwise the advantages of the dispersion are lost. Small soluble fractions, up to about 10 percent of the total amount of polymer, are not as a rule detrimental. Whether or not an organic liquid is suitable as regards the conditions of insolubility or sparing solubility of the polymer may be ascertained without difficulty by preliminary experiment. As a rule, sparing solubility in organic liquids can be caused by ionic comonomers, i.e. for example those of group (') or (b) strongly polar comonomers, such as acrylonitrile or methacrylonitrile; moreover, sparing solubility may be effected for example by N-methylol compounds from group (a), whereas the alkyl ethers of these methylol compounds, also belonging to (a), make the polymer organophilic and possible soluble.

Thus there is a wide choice between aliphatic hydrocarbons, such as octane and ligroin, cycloaliphatic hydrocarbons, such as cyclohexane and perhydronaphthalene, aromatic hydrocarbons, such as benzene, toluene, the xylenes and terpenes, $C_1$ to $C_8$ alkanols, and aliphatic ketones, ethers and esters having up to about 12 carbon atoms. Chlorinated hydrocarbons, such as ethylene chloride, cyclic ethers, such as tetrahydrofuran and dioxane, dimethylsulfoxide, dimethylformamide and acetonitrile, are also suitable. Which of these liquids is preferred therefore depends on the particular application, e.g., the volatility and flashpoint required.

The virtually free choice of organic liquid in which the copolymer dispersion serving as binder in the print paste or dye paste is to be prepared is attributable to a significant extent to the fact that copolymers (d) are used in the production of the said dispersion. The comonomers (a) are characteristic components of the said copolymers (d), while the compounds specified under (b) are suitable as other comonomers. The choice of the two comonomers is governed by the requirement that the copolymer (d) should be soluble in (c) and can be easily made, if necessary after conventional preliminary experiments.

The following approximate values (given in each case in percent by weight) for the relative proportions of the components in the copolymer dispersion are found to be suitable, but are not critical:

comonomer (a): 1 to 30 percent, preferably 5 to 15 percent;
comonomer (b): 99 to 70 percent, preferably 95 to 85 percent; (in each case with reference to the total amount of the comonomers (a) and (b)):
comonomer (a) in (d): 1 to 30 percent, preferably 5 to 15 percent, with reference to (d).

The amount of (d) should be about 3 to 100 percent, preferably 10 to 30 percent, of the amount of (b). The amount of (d) may also be calculated as about 2.1 to 99 percent, or preferably 8.5 to 28.5 percent by weight, when taken with reference to the total weight of (a) and (b). The mixture of the copolymer of (a) and (b) and the copolymer (d) together in the finished dispersion should form a solids fraction of 20 to 80 percent, preferably 30 to 70 percent, with reference to the total amount of dispersion.

It should also be stated that it is possible to start from mixtures of different comonomers (a) or (b). This is also true of copolymer (d) and particularly of the organic liquid (c), whose solubility properties may thereby be substantially altered.

The copolymerization necessary for the production of the binder dispersion may be carried out by conventional methods, for example by placing the bulk of the liquid (c) together with the copolymer (d) dissolved therein in a container and allowing the comonomer mixture of (a) and (b) to flow thereinto at 40° to 100° C. at a rate commensurate with the progress of the copolymerization.

Compounds forming free radicals, such as benzoyl peroxide, cumene peroxide, lauroyl peroxide, perbenzoic acid, ammonium persulfate and azodiisobutyronitrile may be used as polymerization initiators in amounts of 0.01 to 5 percent with reference to the total amount of comonomers (a) and (b).

The copolymer (d) acts as a polymeric emulsifier for the copolymer of (a) and (b). The use of other dispersing agents is thus not necessary and this is a great advantage of the invention.

The binder dispersions prepared in this way are compatible with all other components necessary for the production of print pastes and dye pastes ready for use, i.e., with pigment and thickeners of all types, and in general also with all conventional assistants and additives, for example emulsifiers, other cross-linking components, cross-linking catalysts and film-forming substances.

The pigments used may be inorganic pigments, such as titanium dioxide, carbon black, the various iron oxides, cadmium yellow and cadmium red, and organic pigments of the azo, anthraquinone and phthalocyanine series, including the various insoluble salts (lakes) of acid and basic dyes.

Suitable thickeners for the print pastes and dye pastes are for example polymers of all types which are soluble in the organic liquid. The preferred thickeners however are low-body emulsion thickeners with water which are like those used in the production and composition of the conventional emulsion thickenings with the difference that the binder is present in the outer phase.

Examples of other cross-linking components are particularly bifunctional and polyfunctional aminoplast-forming monomeric, oligomeric or polymeric substances, such as dimethylolurea, dimethyloltrimethylenurea, dimethylolglyoxal monoureine, tetramethylolglyoxal diureine, dimethylolbutanediolurethane, urea-formaldehyde urea/formaldehyde and melamine/formaldehyde precondensates.

The print pastes and dye pastes according to the invention have in other respects the same quantitative composition as conventional agents used in pigment printing or pigment dyeing, i.e., they contain besides the organic phase (=100 percent), 1 to 30 percent of the cross-linkable binder (solids content), 0.1 to 10 percent of pigment and and if desired 0.5 to 10 percent of other cross-linking components, 01 to 5 percent of emulsifiers, 0.5 to 10 percent of film-forming substances and other agents in conventional concentrations. The print pastes differ from the dye pastes essentially only in their greater viscosity; the term dye pastes therefore includes formulations having more of a liquid than a pasty consistency.

Fibrous material of all types, for example cellulosic material such as cotton, wool, synthetic material such as polyamides, polyacrylonitrile and polyesters, may be printed or dyed with the print pastes and dye pastes by all the methods conventionally used (for the purpose).

After application to the substrate, the binder is cross-linked by way of the methylol groups or methylol ether groups contained therein, with the formation of a solid coating. The process may be accelerated in a known manner by heating and/or by means of acid cross-linking catalysts, such as ammonium nitrate, ammonium thiocyanate or ammonium oxalate. These catalysts are required in amounts of from about 0.01 to 5 percent (with reference to the solids content of the copolymer dispersion).

In the cross-linking, the copolymer (d), which during the production of the dispersion acted as a dispersing agent, is built into the macromolecular network of the binder with the result that the property of (d) as a dispersing agent is lost. This has a very advantageous effect on the durability of the prints and dyeings which are extremely resistant to the action of solvents of all types.

The invention is illustrated by the following examples in which parts and percentages are by weight, unless otherwise stated. Parts by weight have the same relation to parts by volume as the kilogram to the liter.

EXAMPLE 1

A print binder is prepared from 300 parts of binder dispersion the preparation of which is described below) by stirring said dispersion into a solution of 6 parts of ammonium nitrate and 15 parts of the methylolated diurethane of butanediol in 480 parts by volume of water by means of an impeller (about 3,000 r.p.m.). A printing formulation is prepared from 95 parts of this print binder and 5 parts of an about 30 percent aqueous paste of an iron oxide pigment. Cotton cloth and rayon staple fiber cloth are printed with this formulation on a roller printing machine, predried at about 50° C. and then heated for 15 minutes at 130° C. Prints having very good wet fastness properties are obtained in this way.

The copolymer dispersion serving as binder is prepared as follows: 300 parts of gasoline (boiling point 80° to 140° C.), 150 parts of a 65 percent solution of a copolymer of 200 parts of styrene, 720 parts of ethylhexyl acrylate, 30 parts of N-vinylimidazole and 50 parts of the butyl ether of N-methylolmethacrylamide are introduced into a mixture (5:2) of xylene and ethyl acetate and 40 parts of azoisobutyronitrile.

The mixture is heated in an atmosphere of nitrogen, while stirring, to 75° to 80° C. and 200 parts of ethyl acrylate is added thereto. After polymerization has begun, a mixture of 50 parts of the butyl ether of N-methylolmethacrylamide, 750 parts of ethyl acrylate and 1,200 parts of gasoline (boiling point 80° to 140° C.) is added in the course of 2 hours. The whole is heated for another hour at 75° to 80° C. and a dispersion is obtained having a solids content of 38 percent.

EXAMPLE 2

The procedure of example 1 is followed, the binder dispersion used therein being replaced by a copolymer dispersion of 75 percent of ethyl acrylate, 10 percent of acrylonitrile and 15 percent of the butyl ether of N-methylolmethacrylamide. Similar results are obtained.

EXAMPLE 3

A 40 percent dispersion of 15 percent of vinyl propionate, 77 percent of ethyl acrylate and 8 percent of the butyl ether of N-methylolmethacrylamide is used and in other respects the procedure described in example 1 is followed. Prints having very good fastness properties are again obtained.

We claim:
1. A print paste or dye paste for printing or dyeing fibrous material comprising a pigment and an organic liquid and also containing a dispersion of a copolymer as a binder which has been prepared by free-radical copolymerization of:
   a. 1 to 30 percent by weight of a monomer selected from the group consisting of the N-methylolamides and N-alkoxymethylamides of acrylic acid, methacrylic acid, crotonic acid, αchloroacrylic acid, itaconic acid, maleic acid and N-acryloylurea, the alkyl group of the N-alkoxymethyl group containing one to four carbon atoms; and
   b. 99 to 70 percent by weight of a comonomer selected from the group consisting of alkylesters of acrylic acid, methacrylic acid and maleic acid with one to 12 carbons in the alkyl radical, vinylesters of alkylcarboxylic acids having two to 24 carbon atoms in the alkyl radical, styrene, vinyl chloride, vinylidene chloride, acrylonitrile, methacrylonitrile, N-vinylpyrrolidone, butadiene, acrylic acid, methacrylic acid, maleic acid, maleic anhydride, acrylamide, methacrylamide, N-vinylimidazole and N-vinylimidazolium methyl sulfate; in the presence of
   c. 50 to 300 percent by weight of an organic liquid in which the copolymer formed is insoluble, and
also in the presence of
   d. 2.1 to 99 percent by weight of a copolymer of comonomers of groups (a) and (b) which is soluble in the organic liquid (c) the percentages by weight of all components (a), (b), (c) and (d) being taken with reference to the total weight of (a) and (b).

2. A print paste or dye paste comprising a pigment and organic liquid as claimed in claim 1, wherein the dispersion of the copolymer has been prepared using, as comonomer (a), at least one N-methylolamide or N-alkoxymethylamide of acrylic or methacrylic acid.

3. A print paste or dye paste as claimed in claim 1 wherein the copolymer (d) contains, as the characteristic comonomer, at least one N-methylolamide or N-alkoxymethylamide of acrylic or methacrylic acid.

4. A print paste or dye paste for printing or dyeing fibrous material as claimed in claim 2 containing a pigment and an organic liquid and also a dispersion of a copolymer as a binder which has been prepared by free-radical copolymerization of:
   a. 5 to 15 percent by weight of a monomer selected from the group consisting of the N-methylolamides and N-alkoxymethylamides of acrylic acid, methacrylic acid, crotonic acid, α-chloroacrylic acid, itaconic acid, maleic acid and N-acryloylurea, the alkyl group of the N-alkoxymethyl group containing one to four carbon atoms; and b. 95 to 85 percent by weight of a comonomer selected from the group consisting of alkylesters of acrylic acid, methacrylic acid and maleic acid with one to 12 carbons in the alkyl radical, vinylesters of alkylcroboxylic acids having two to 24 carbon atoms in the alkyl radical, styrene, vinyl chloride, vinylidene chloride, acrylonitrile, methacrylonitrile, N-vinylpyrrolidone, butadiene, acrylic acid, methacrylic acid, maleic acid, maleic anhydride, acrylamide, methacrylamide, N-vinylimidazole and N-vinylimidazolium methyl sulfate; in the presence of c. 50 to 300 percent by weight of an organic liquid in which the copolymer formed is insoluble, and in the presence of d. 8.5 to 28.5 percent by weight of a copolymer of the comonomers (a) and (b) which is soluble in the organic liquid (c).

5. A print paste or dye paste for printing or dyeing fibrous material as claimed in claim 3 containing a pigment and an organic liquid and also a dispersion of a copolymer as a binder which has been prepared by free-radical copolymerization of:

a. 5 to 15 percent weight of a monomer N-alkoxymethylamides of acrylic acid, methacrylic acid, maleic acid and N-acryloylurea, the alkyl group of the N-alkoxymethyl group containing one to four carbon atoms; and b. 95 to 85 percent by weight of a comonomer selected from the group consisting of alkylesters of acrylic acid, methacrylic acid and maleic acid with one to 12 carbons in the alkyl radical, vinylesters of alkylcarboxylic acids having two to 24 carbon atoms in the alkyl radical, styrene, vinyl chloride, vinylidene chloride, acrylonitrile, mathacrylonitrile, N-vinylpyrrolidone, butadiene, acrylic acid, methacrylic acid, maleic acid, maleic anhydride, acrylamide, methacrylamide, N-vinylimidazole and N-vinylimidazolium methyl sulfate; in the presence of c. 50 to 300 percent by weight of an organic liquid in which the copolymer formed is insoluble, and in the presence of d. 8.5 to 28.5 percent by weight of a copolymer of the comonomers (a) and (b) which is insoluble in the organic liquid (c).

6. A print paste or dye paste for printing or dyeing fibrous material as claimed in claim 4 containing a pigment and an organic liquid and also, as binder, a dispersion of a copolymer which has been prepared from:

a. 5 percent by weight of the butyl ether of N-methylolmethacrylamide with b. 95 percent by weight of ethyl acrylate, in c. 160 percent by weight of gasoline having a boiling point of from 80° to 140° C., and in the presence of d. 10 percent by weight of a copolymer of 20 percent by weight of styrene, 72 percent by weight of ethylhexyl acrylate, 3 percent by weight N-vinylimidazole and 5 percent by weight of the butyl ether of N-methylolmethacrylamide.

7. A print paste or dye paste for printing or dyeing fibrous material as claimed in claim 5 containing a pigment and an organic liquid and also, as binder, a dispersion of a copolymer which has been prepared from:

a. 5 percent by weight of the butyl ether of N-methylolmethacrylamide with b. 95 percent by weight of ethyl acrylate, in c. 160 percent by weight of gasoline having a boiling point of from 80° to 140° C, and in the presence of d. 10 percent by weight of a copolymer of 20 percent by weight of styrene, 72 percent by weight of ethylhexyl acrylate, 3 percent by weight N-vinylimidazole and 5 percent by weight of the butyl ether of N-methylolmethacrylamide.

8. Print pastes and dye pastes for printing or dyeing fibrous material as claimed in claim 4 containing a pigment and an organic liquid and also, as a binder, a dispersion of a copolymer which has been prepared from:

a. 15 percent by weight of the butyl ether N-methylolmethacrylamide with b. 75 percent by weight of ethyl acrylate and 10 percent by weight of acrylonitrile, in c. 160 percent by weight of gasoline having a boiling point of 80° to 140° C, and in the presence of d. 10 percent by weight of a copolymer of 20 percent by weight of styrene, 72 percent by weight of ethylhexyl acrylate, 3 percent by weight of N-vinylimidazole and 5 percent by weight of the butyl ether of N-methylolmethacrylamide.

9. Print pastes and dye pastes for printing or dyeing fibrous material as claimed in claim 5 containing a pigment and an organic liquid and also, as a binder, a dispersion of a copolymer which has been prepared from:

a. 15 percent by weight of the butyl ether N-methylolmethacrylamide with b. 75 percent by weight of ethyl acrylate and 10 percent by weight of acrylonitrile, in c. 160 percent by weight of gasoline having a boiling point of 80° to 140° C, and in the presence of d. 10 percent by weight of a copolymer of 20 percent by weight of styrene, 72 percent by weight of ethylhexyl acrylate, 3 percent by weight of N-vinylimidazole and 5 percent by weight of the butyl ether of N-methylolmethacrylamide.

10. A print paste or dye paste for printing or dyeing fibrous material as claimed in claim 4 containing a pigment and an organic liquid and also, as a binder, a dispersion of a copolymer which has been prepared from:

a. 8 percent by weight of the butyl ether of N-methylolmethacrylamide with b. 77 percent by weight of ethyl acrylate and 15 percent by weight of vinyl propionate, in c. 160 percent by weight of gasoline having the boiling point 80° to 140° C., and in the presence of d. 10 percent by weight of a copolymer of 20 parts by weight of styrene, 72 parts by weight of ethylhexyl acrylate, 3 parts by weight of N-vinylimidazole and 5 parts by weight of the butyl ether of N-methylolmethacrylamide.

11. A print paste or dye paste for printing or dyeing fibrous material as claimed in claim 5 containing a pigment and an organic liquid and also, as a binder, a dispersion of a copolymer which has been prepared from:

a. 8 percent by weight of the butyl ether of N-methylolmethacrylamide with b. 77 percent by weight of ethyl acrylate and 15 percent by weight of vinyl propionate, in c. 160 percent by weight of gasoline having the boiling point 80° to 140° c., and in the presence of d. 10 percent by weight of a copolymer of 20 parts by weight of styrene, 72 parts by weight of ethylhexyl acrylate, 3 parts by weight of N-vinylimidazole and 5 parts by weight of the butyl ether of N-methylolmethacrylamide.

12. A print paste or dye paste as claimed in claim 4 which contains a bifunctional or polyfunctional aminoplast-forming substance as a cross-linking component.

13. A print paste or dye paste as claimed in claim 5 which contains a bifunctional or polyfunctional aminoplast-forming substance as a cross-linking component.

PO-1050
(5/69)

UNITED STATES PATENT OFFICE
CERTIFICATE OF CORRECTION

Patent No. 3,607,820      Dated September 21, 1971

Inventor(s) Hans Wilhelm et al

It is certified that error appears in the above-identified patent and that said Letters Patent are hereby corrected as shown below:

First page, left-hand column, fourth line, "Manheim" should read -- Mannheim --.

Column 1, line 8, "dyeing" should read -- dyeings --; line 73, "(') or (b)" should read -- (b') or (by) --.

Column 2, line 3, "possible" should read -- possibly --.

Column 3, line 26, "01" should read -- 0.1 --.

Column 4, line 38, Claim 1, "$\alpha$chloroacrylic" should read -- $\alpha$-chloroacrylic --.

Column 5, line 7, Claim 4, "alkylcroboxylic" should read -- alkylcarboxylic --; line 24, claim 5, "percent weight" should read -- percent by weight --; line 24, after "monomer" insert -- selected from the group consisting of --.

Signed and sealed this 25th day of April 1972.

(SEAL)
Attest:

EDWARD M. FLETCHER, JR.      ROBERT GOTTSCHALK
Attesting Officer      Commissioner of Patents